United States Patent
Bard et al.

(10) Patent No.: US 12,263,724 B2
(45) Date of Patent: Apr. 1, 2025

(54) ANTIREFLECTIVE SWITCHABLE GLASS CONSTRUCTION

(71) Applicant: ACR II GLASS AMERICA INC., Nashville, TN (US)

(72) Inventors: Michael Bard, Wadern (DE); Olivier Farreyrol, Wasserbilig (LU); Christina Hill, Welschbilig (DE); Yu Matsuda, Nashville, TN (US)

(73) Assignee: ACR II GLASS AMERICA INC., Nashville, TN (US)

( * ) Notice: Subject to any disclaimer, the term of this patent is extended or adjusted under 35 U.S.C. 154(b) by 696 days.

(21) Appl. No.: 17/282,273

(22) PCT Filed: Oct. 3, 2019

(86) PCT No.: PCT/US2019/054396
§ 371 (c)(1),
(2) Date: Apr. 1, 2021

(87) PCT Pub. No.: WO2020/072714
PCT Pub. Date: Apr. 9, 2020

(65) Prior Publication Data
US 2021/0387513 A1    Dec. 16, 2021

Related U.S. Application Data

(60) Provisional application No. 62/795,173, filed on Jan. 22, 2019, provisional application No. 62/741,078, filed on Oct. 4, 2018.

(51) Int. Cl.
*B60J 3/04* (2006.01)
*B32B 17/10* (2006.01)
(Continued)

(52) U.S. Cl.
CPC .......... *B60J 3/04* (2013.01); *B32B 17/10036* (2013.01); *B32B 17/10321* (2013.01);
(Continued)

(58) Field of Classification Search
CPC ....... B60J 3/04; B60J 3/007; B32B 17/10036; B32B 17/10321; B32B 17/10504;
(Continued)

(56) References Cited

U.S. PATENT DOCUMENTS 10,625,580 B1 *   4/2020   Jones ....................... B60J 3/007
2007/0256782 A1 * 11/2007   Haldeman ......... B32B 17/10633
                                                                428/524
(Continued)

FOREIGN PATENT DOCUMENTS

CN          105026146 A       11/2015
CN          106873197 A        6/2017
(Continued)

OTHER PUBLICATIONS

Dictionary definition of "tinted," Cambridge Advanced Learner's Dictionary. Downloaded on Aug. 26, 2024 from https://dictionary.cambridge.org/dictionary/english/tinted. (Year: 2024).*

(Continued)

*Primary Examiner* — Angela M. Medich
(74) *Attorney, Agent, or Firm* — K&L Gates LLP

(57) ABSTRACT

An antireflective switchable laminated glass construction having a switchable functional film formed of a switchable material layer, a first polymer substrate with a first transparent conductive coating, and a second polymer substrate with a second transparent conductive coating. The switchable functional film is sandwiched between first adhesive polymer interlayer and glass substrate and second adhesive polymer interlayer and glass substrate. The switchable laminated glass construction in an ON (transparent) state has a (Continued)

total light transmittance higher than 50% and a reflectance equal to or less than 13%, as measured from at least one side of the switchable laminated glass construction.

16 Claims, 9 Drawing Sheets

(51) Int. Cl.
    *B60J 1/00*     (2006.01)
    *C03C 17/36*     (2006.01)
    *G02F 1/1334*     (2006.01)

(52) U.S. Cl.
    CPC .. *B32B 17/10504* (2013.01); *B32B 17/10761* (2013.01); *B60J 1/001* (2013.01); *C03C 17/3644* (2013.01); *G02F 1/1334* (2013.01); *C03C 2217/73* (2013.01); *C03C 2217/948* (2013.01)

(58) Field of Classification Search
    CPC ......... B32B 17/10174; B32B 17/10211; B32B 17/10972
    See application file for complete search history.

(56) References Cited

U.S. PATENT DOCUMENTS

| 2009/0115922 | A1* | 5/2009 | Veerasamy ......... C03C 17/3681 349/16 |
|---|---|---|---|
| 2012/0307337 | A1 | 12/2012 | Bartug et al. |
| 2013/0286458 | A1 | 10/2013 | Lamine et al. |
| 2015/0138627 | A1 | 5/2015 | Ehrensperger et al. |
| 2015/0331296 | A1 | 11/2015 | Mennig et al. |

FOREIGN PATENT DOCUMENTS

| DE | 102007015415 | A1 | 10/2008 |
|---|---|---|---|
| DE | 102016216929 | A1 | 3/2018 |
| DE | 202019100577 | U1 | 3/2019 |
| JP | S62147434 | A | 7/1987 |
| JP | 2004151575 | A | 5/2004 |
| JP | 2013007935 | A | 1/2013 |
| JP | 2015524079 | A | 8/2015 |
| JP | 2015529183 | A | 10/2015 |
| JP | 3203546 | U | 4/2016 |
| JP | 2018124449 | A | 8/2018 |
| WO | 2009061329 | A1 | 5/2009 |
| WO | WO2010119797 | A1 | 10/2010 |
| WO | 2017/093642 | A1 | 6/2017 |
| WO | 2017/135182 | A1 | 8/2017 |
| WO | 2019/074888 | A1 | 4/2019 |
| WO | 2019212745 | A2 | 11/2019 |

OTHER PUBLICATIONS

Thesaurus entry of "tinted," Merriam Webster Thesaurus. Downloaded on Aug. 26, 2024 from https://www.merriam-webster.com/thesaurus/tinted. (Year: 2024).*

Chinese Decision of Rejection from corresponding Chinese Patent Application No. 201980065323.X, issued Jan. 5, 2023.

Extended Supplementary Search Report for related European Application No. 19868775.8; action dated Jul. 13, 2022; (12 pages).

International Search Report and the Written Opinion for International application No. PCT/US2019/054396, filed Oct. 3, 2019, mailed on Jan. 6, 2020 by International Search Authority, 9 pages.

Office Action for related Chinese Application No. 201980065228.X; action dated Aug. 18, 2022; (13 pages).

Japanese Notification of Reasons for Refusal for Japanese Patent Application No. 2021-543980, mailed Oct. 24, 2023. English Translation only, 4 pages.

Notice of Reasons for Refusal for Japanese Application No. 2021-514989 dated Jun. 15, 2023.

First European search opinion for EP Application No. 19868307.0 dated Oct. 26, 2021, 4 pages.

Examination Report for EP Application No. 19868307.0 dated Jan. 29, 2024, 6 pages.

Notice of Reasons for Refusal for Japanese Application No. 2021-514989 dated Nov. 17, 2023.

* cited by examiner

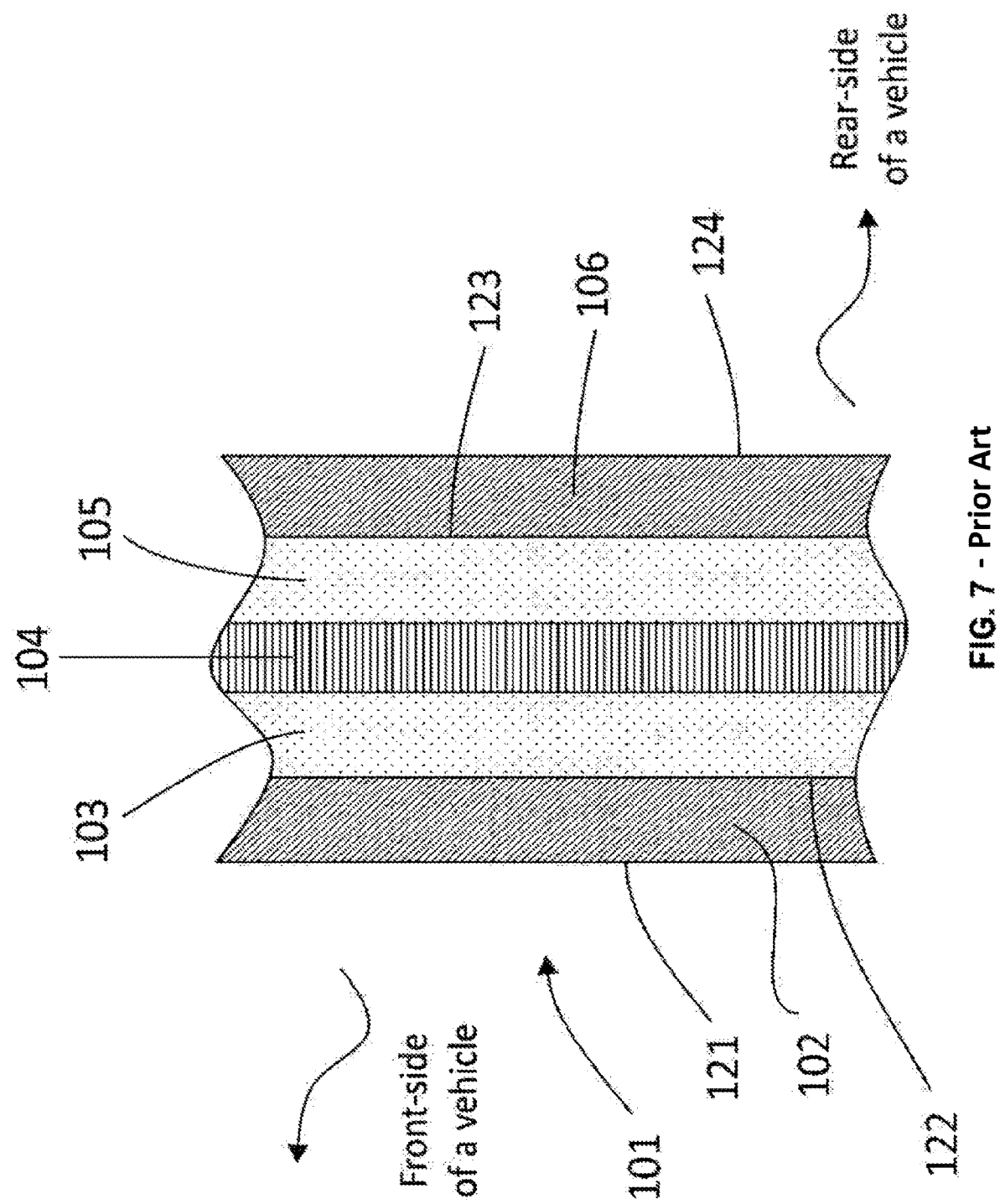
FIG. 7 - Prior Art

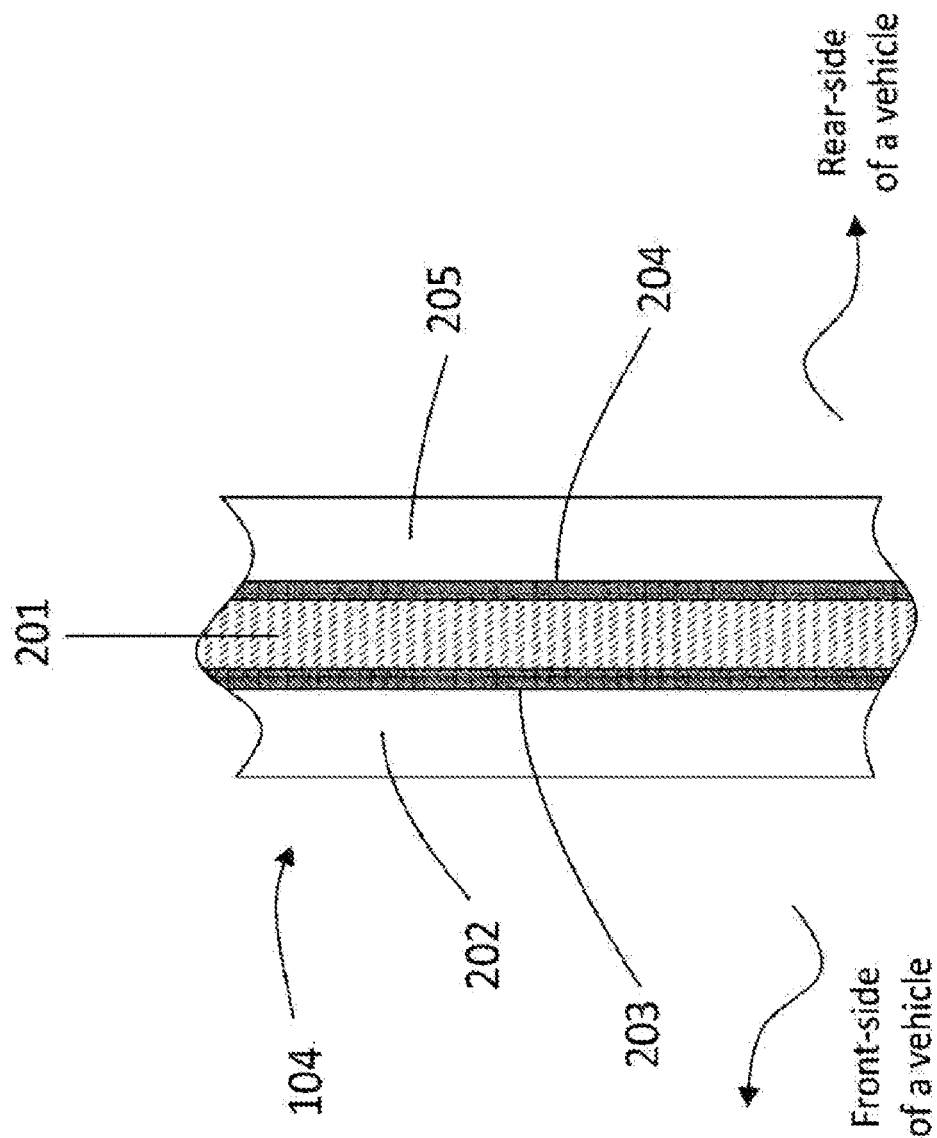
FIG. 8 - Prior Art

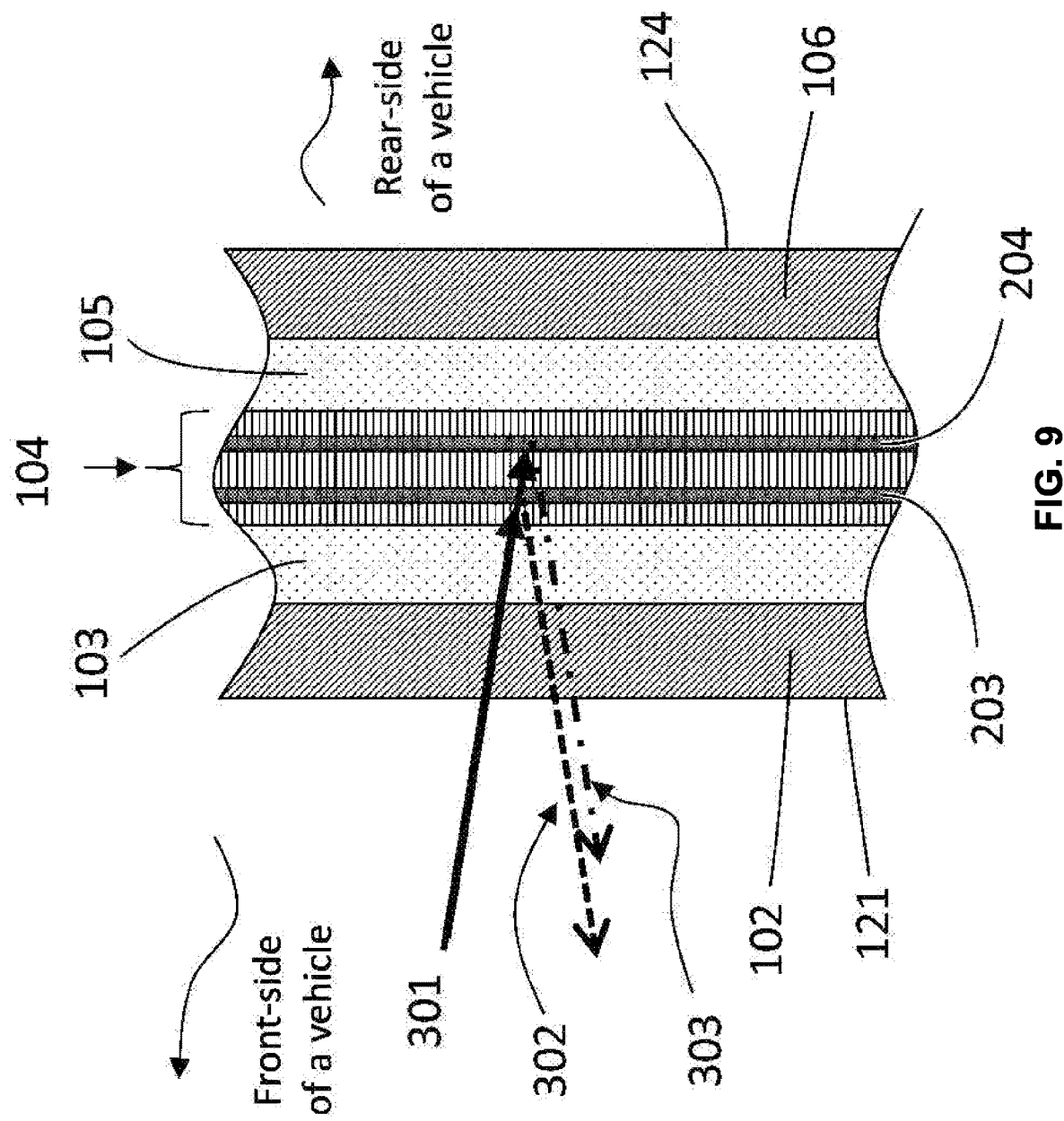

ANTIREFLECTIVE SWITCHABLE GLASS CONSTRUCTION

CROSS REFERENCES TO RELATED APPLICATIONS

This application is a national stage of PCT International Application No. PCT/US2019/054396, filed on Oct. 3, 2019, which claims benefit under 35 U.S.C. § 1.119(b) in U.S., or similar statues in other countries, of U.S. provisional patent application Ser. No. 62/795,173, filed Jan. 22, 2019, entitled "ANTIREFLECTIVE SWITCHABLE GLASS CONSTRUCTION", and also of U.S. provisional patent application Ser. No. 62/741,078, filed Oct. 4, 2018, entitled "MULTIFUNCTIONAL SWITCHABLE FILM AND CONSTRUCTIONS INCLUDING SUCH A FILM," the entire contents of both of which are incorporated herein in their entirety.

TECHNICAL FIELD

The present disclosure is generally directed to switchable (e.g., polymer dispersed liquid crystal (PDLC), suspended particle device (SPD) or electrochromic) glass constructions, and methods for forming switchable glass constructions which may be used in automotive or architectural windows.

BACKGROUND

Switchable glass constructions using layered glass structures may be used, for example and without limitation, as architectural or vehicle windows, including internal partitions or sunroofs, capable of selectively switching between an opaque (OFF) state for blocking, e.g., visible light, infrared and/or ultraviolet energy, and/or providing privacy, and a transparent (ON) state for allowing light or some light to pass through the construction. Some switchable glass constructions may also be configured to have a reverse-mode alignment. In a default OFF state, the switchable glass construction is transparent, and in an ON state with an electric voltage applied, it is opaque.

The switching function, using for example a PDLC film (without limitation), may be accomplished by applying an electric field to a switchable PDLC material or layer within the glass construction. When a PDLC material is subjected to an applied electric field, discrete formations, such as droplets of a liquid crystal(s) dispersed throughout a polymer matrix in the PDLC, assume a transparent state because the long molecular axes of the liquid crystals align in a nematic (parallel) orientation in the direction of the electric field. The parallel orientation provides a direction for light to pass through.

PDLC materials are typically formed by initiating polymerization of a monomer mixed with a liquid crystal(s) and then curing the polymer matrix, resulting in a phase separation of the liquid crystal into distinct domains thought the rigid polymer backbone.

In a typical switchable glass construction, the switchable material (e.g., PDLC, SPD or electro-chromic) may be provided between two polymer films, such as polyethylene terephthalate (PET) films, which may be coated with a transparent conductive material (e.g., TCO such as indium tin oxide (ITO)) between each polymer film and the switchable material. The PDLC film including the polymer films, transparent conductive materials, and any interlayers may be laminated between at least one glass substrate on each side of the PDLC film.

Application of an electric field to the switchable material from a voltage source connected to the transparent conductive materials may turn the switchable material from an OFF state to a fully or partially ON state.

Therefore, switchable glass is used, e.g., in architectural and transportation applications (e.g., vehicles, planes, trains, boat, etc.) where windows, interior partitions or walls wherein the ability to change from an opaque state to a transparent state is desired. For example, an opaque state may be preferable for blocking light and/or providing privacy, and a transparent state may be preferable for visibility. PDLC switchable glass constructions are capable of switching between OFF and ON states, and partially ON states, using known power supplies and switch mechanisms.

Switchable glazings, including PDLC constructions may be, without limitation, used for an internal partition in a vehicle to provide privacy, including between a vehicle driver in the front of the vehicle and passenger(s) in the rear.

A conventional switchable laminated glass construction 101 used as a partition in a vehicle is shown in FIG. 7. A first glass substrate 102 with surfaces 121, 122 and a second glass substrate 106 with surfaces 123, 124 may be a clear glass of soda-lime silicate glass.

First and second adhesive polymer interlayers (103, 105) may be a clear-color polyvinyl butyral resin ("PVB"). A switchable functional film layer 104 (detailed in FIG. 8) is sandwiched by the two adhesive polymer interlayers (103, 105) which are each adhered to the first and second glass substrates (102, 106), respectively, to complete the laminated glass construction.

A conventional switchable functional film construction used in the conventional switchable laminate glass is shown in FIG. 8. The conventional switchable functional film comprises switchable material (e.g., PDLC) layer 201 sandwiched between a first and second TCO layers (e.g., ITO) (203, 204) each disposed on one of the first and second polymer substrates (e.g., polyethylene terephthalate (PET) substrate) (202, 205).

Current switchable laminated glass constructions may not have desirable reflective and/or absorbing properties and allow an undesirably high level of light reflection from the glass construction. This may be particularly undesirable for some automotive glass application where reflectivity may negatively affect the vision of a driver, directly or indirectly.

Thus, a need exists for a switchable laminated glass construction that is suitable for automotive applications, especially for an automotive partition wall, and addresses the drawbacks identified above.

BRIEF SUMMARY OF EXEMPLARY EMBODIMENTS

An exemplary embodiment is a switchable laminated glass construction, comprising: a first glass substrate; a second glass substrate; a switchable functional film between the first and second glass substrates, the switchable functional film comprising: a switchable material layer, a first polymer substrate formed with a first transparent conductive coating, wherein the first polymer substrate is between the first glass substrate and the switchable material layer, and a second polymer substrate formed with a second transparent conductive coating, wherein the second polymer substrate is between the second glass substrate and the switchable material layer; a first adhesive polymer interlayer between the first glass substrate and the switchable functional film; and a second adhesive polymer interlayer between the second glass substrate and the switchable functional film; wherein the switchable laminated glass construction has a total light transmittance higher than 50% in an ON (transparent) state, as measured from at least one side of the switchable laminated glass construction; wherein the switchable laminated glass construction has a reflectance equal to or less than 13% in an ON (transparent) state, as measured from at least one side of the switchable laminated glass construction.

An exemplary embodiment is generally directed to a switchable glass construction configured to, among other things, improve aesthetic feature of the glass construction by desirable anti-reflective nature of the construction. In this respect, a darkened layer and/or an anti-reflective layer is provided on either or both sides of the switchable functional film of the glass construction.

For purposes of this disclosure, including with reference to the figures, a "darkened" layer is a material layer that reduces the amount of visible light through the same or comparable material in a non-darkened state, such as a clear soda-lime glass or clear PVB polymer interlayer which are known in the art. A "side" of the switchable laminated glass construction is a major surface of the glass construction. The switchable laminated glass construction may be provided as a part of an internal partition between a driver side and a passenger side in a vehicle, an exterior window (e.g., windshield or sunroof) of a vehicle, or an internal partition or an exterior window of a building. A "first" glass substrate will refer to a glass substrate facing a driver side (the front) when used in an interior vehicle window or a glass substrate on an exterior side of an exterior facing window. A "second" glass substrate will refer to a glass substrate facing a passenger side (the rear) when used in an interior vehicle window or a glass substrate on an interior side of an exterior facing window. A term "switchable glass construction," a term "switchable laminated glass construction (SLGC)," and a term "laminated glazing" are equivalent to each other and used interchangeably in this disclosure.

In an exemplary embodiment, an anti-reflective layer may be provided adjacent to at least one of the first and second transparent conductive coatings and the first and second glass substrates, thereby reducing reflection of the light from the glass construction. A darkened layer on either or both sides of the switchable functional film may also reduce reflection of light from the laminated glazing. Darkened glass substrates may absorb increased levels of unwanted light transmission when compared to clear glass substrates which may limit the light reaching a switchable film and the light which is reflected from the switchable film. These and other potential dark materials, layers, and/or substrates may be darkened to various degrees using known techniques for achieving desired levels of visibility with respect to the switchable functional film.

Depending on the application of a glazing, the total light transmittance (LTa) through the switchable laminated glass in an ON (transparent) state may be at least 50%, preferably at least 60%, and more preferably at least 70%, further more preferably at least 80%. Particularly, the total light transmittance may be measured according to ASTM D1003-00, "Standard Test Method for Haze and Luminous Transmittance of Transparent Plastic, with the conditions where light source A and Procedure A "Haze meter" are used. A haze meter "Haze_Gard i" having an integrated sphere by BYK may be used for LTa measurements. With the exemplary embodiments, the total light reflectance (Rfx) of the switchable glass construction is preferably less than 13%, more preferably less than 9%, and even more preferably less than 5% in the "ON" (transparent) state.

These and other embodiments may further include any suitable number of interlayers in any arrangement, e.g., for reflecting and/or absorbing visible light. For example, and without limitation, exemplary embodiments may optionally include one or more infrared reflecting (IR) coatings/layers, low-emissivity (low-E) coatings/layers, ultraviolet (UV) blocking coatings/layers, anti-fogging layers, and/or paints. Among other things, exemplary embodiments with or without the additional identified layers may allow less transmission of light through the glass construction than in known switchable glass for architectural applications.

The scope of this disclosure should not be limited to the details of construction or the arrangement of components set forth in the written description or figures. Those of ordinary skill in the art will understand the exemplary embodiments may be practiced using other components, materials, structures, or designs consistent with this disclosure. In addition, the language and terminology of this disclosure, including the Abstract of the disclosure, is representative and is provided for purposes of this disclosure and should not be considered limiting.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 7 illustrates a conventional construction of a switchable laminated glass, for example, used as a partition in a luxury vehicle;

FIG. 8 illustrates a conventional construction of a switchable functional film which is used in a switchable laminated glass construction; and FIG. 9 illustrates an example of reflective light in a conventional construction of a switchable laminated glass (problem to be solved).

DETAILED DESCRIPTION

Figure 1:
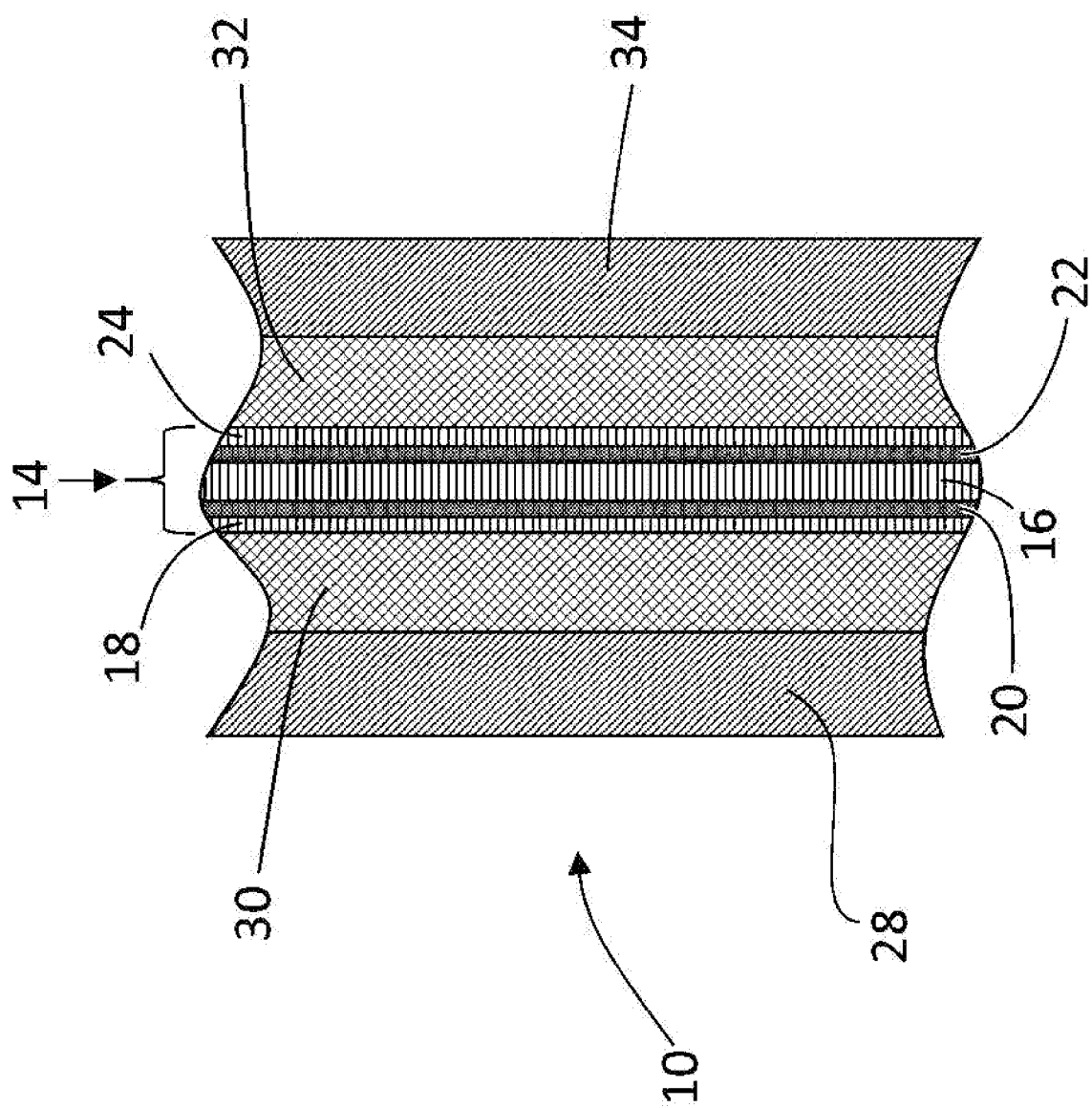
FIG. 1 illustrates an example switchable glass construction, according to an exemplary aspect of the present disclosure.

A switchable (PDLC) laminated glass construction and methods for forming PDLC laminated glass constructions is described in the "POLYMER DISPERSED LIQUID CRYSTAL GLASS CONSTRUCTION" of PCT publication number WO/2017/135182, which is expressly incorporated by reference herein in its entirely.

In the following description, for purposes of explanation, specific details are set forth to promote a complete understanding of one or more aspects of the disclosure. It may be evident in some or all instances, however, that any aspects described below can be practiced without adopting the specific design details described below.

As described herein, a switchable laminated glass may be used for exterior and interior applications in a vehicle, including an interior partition. In some embodiments, clear glass substrates and clear polymer interlayers may be preferably used in a vehicle interior partition to obtain clear vision or visibility between a driver side and a passenger side in an "ON" (transparent) state. For example, total light transmittance (LTa) through the switchable laminated glass in a transparent state may preferably be at least 50%, preferably at least 60%, and more preferably at least 70%, further more preferably 80%.

Although clear color glass substrates and polymer interlayers are useful to achieve certain levels of total light transmittance as described above, some drawbacks of such construction may exist. For example, relatively strong reflective light from the transparent conductive (e.g., transparent conductive oxide) layers (see FIG. 9) may not meet aesthetic requirements of a particular use of the switchable glazing in an "ON" (transparent) state, including in a vehicle interior. Aesthetic requirements may be further unmet in an "OFF" (opaque) state where (total) reflection may be higher than in the "ON" (transparent) state.

In an example conventional laminated glass construction comprising clear soda-lime glass substrates without a switchable functional film, the glass construction may have a total light reflectance of about 8% (about 4% from a surface 121 of the first glass substrate 102, plus about 4% from a surface 124 of the second glass substrate 106). It has been found that the total reflectance of the conventional switchable laminated glass construction including a switchable functional film layer 104 sandwiched by the two adhesive polymer interlayers 103, 105, as shown in FIG. 9, may be about 15% in the "ON" state and about 20% in the "OFF" state. In some embodiments, the switchable laminated glass construction may have a higher total reflectance in the OFF (opaque) state relative to the ON (transparent) state at least in part due to a larger contribution of diffused light reflected from the switchable functional film in the OFF (opaque) state. The total reflectance measurements may be carried out in the following conditions: using a reflected color spectrophotometer such as an UltraScan XE of Hunter Lab, specular plus diffuse reflectance (RSIN), 360-750 nm of the spectral range, 10 nm of the wavelength interval, pulsed Xenon light source, and 15 cm sphere for diffuse illumination. In FIG. 9, an incident light 301 is shown reflected as reflected light 302 at the first transparent conductive coating layer 203 and reflected as reflected light 303 at the second transparent conductive coating layer 204.

Among other features, the present disclosure provides a switchable laminated glass construction with reduced light reflection in both "ON" and "OFF" states, as measured through at least one side of the glazing, which may be suitable for, but not limited to, use in a vehicle, such as a partition in a vehicle interior. Reflectivity may be a concern for a glazing even where, as in an interior vehicle partition, the glazing has no surface facing an exterior.

FIG. 1 shows an exemplary embodiment of a switchable laminated glass construction 10 according to the present disclosure.

A first glass substrate 28 and a second glass substrate 34 may be any suitable color and material, including clear soda-lime silicate glass. The glass substrates 28, 34 are laminated together having a switchable functional film 14 therebetween, wherein the switchable functional film 14 is sandwiched between first and second adhesive polymer interlayers 30, 32 which may include any suitable interlayer material, including, without limitation, polyvinyl butyral resin (PVB) or ethylene vinyl acetate (EVA).

The switchable functional film 14 may include various layers, including a switchable material core layer 16, transparent conductive material 20, 22 on either side of the core layer 16, and polymer films 18, 24 that the transparent conductive material 20, 22 is applied on. The polymer interlayers 30, 32 contact the polymer films 18, 24 directly in the laminated glazing 10. The switchable material layer 16 may be any suitable material which provides a switchable function upon the application of an electrical current. The switchable material core layer 16 may include, for example, a PDLC, SPD, or electrochromic material. A PDLC film may be preferable depending on the desired characteristics of the final glazing, including haze in the switchable material core layer 16. The polymer films 18, 24 may include any suitable polymer, including polyethylene terephthalate (PET). The transparent conductive layers 20, 22 may include any transparent conductive material, which may include various oxides or nanowire materials. Transparent conductive oxides may particularly include indium tin oxide (ITO). A nanowire material may be silver nanowires (AgNW).

The transparent conductive layers 20, 22 may increase the reflectivity of the laminated glazing 10. The conductive materials, including ITO inclusive material, have a reflectivity that adds to the reflectivity of the glass substrates 28, 34 and increases the overall reflectivity of the glazing 10. Reflectivity may occur where there is a change in light paths. For example, where light in the air meets a glass surface, the glass surface has a different index of refraction than the air and some of the light changes direction and is reflected off the glass surface. The amount of reflection depends on the change in an index of refraction where a larger step change in the index of refraction of adjacent layers results in a larger reflectivity at the adjacent layer interface. Thus, reducing the change in the index of refraction may reduce the reflectivity of a surface. The reflectivity may further be reduced by reducing the amount of light which may reach a reflective surface. A switchable laminated glazing includes several surfaces which may contribute to the glazing's total reflectivity. The embodiments disclosed herein provide a reduction in the overall reflectivity of a switchable laminated glazing. It may be appreciated that the embodiments disclosed herein may be used separately or in combination in an individual glazing.

In an exemplary embodiment shown by FIG. 1, at least one of the polymer interlayers 30, 32 is a privacy-colored (dark-colored) interlayer that provides a darkened layer to reduce reflection at the transparent conductive layers 20, 22. In order to reduce reflection from a front-side and a rear passenger side, both of the polymer interlayers 30, 32 may be privacy-colored (darkened) interlayers. The privacy-colored (darkened) interlayer(s) may absorb more light than a clear interlayer which may reduce the amount of light that reaches a reflective conductive layer 20, 22. As such, the reduced amount of light reaching a reflective layer may reduce the amount of light that may be reflected therefrom.

Depending on, among other things, the number, type, and arrangement of interlayers in the switchable glass construction, the materials used, and the darkness of dark layers and/or substrates, various reflection levels with a certain total light transmission (LTa) through the glass construction may be achieved. The darkened polymer interlayer may be any suitable color, which may include light blue green, light bronze, light blue, light grey, grey slate grey or sage grey, to achieve certain levels of the reflection. A total light reflection (Rfx) of the switchable laminated glass construction may preferably be less than 13%, more preferably less than 9%, and even more preferably less than 5% in the "ON" (transparent) state. At the same time, total light transmission LTa may preferably be higher than 50%, more preferably higher than 60%, and more preferably higher than 70%, further more preferably higher than 80%.

Figure 5:
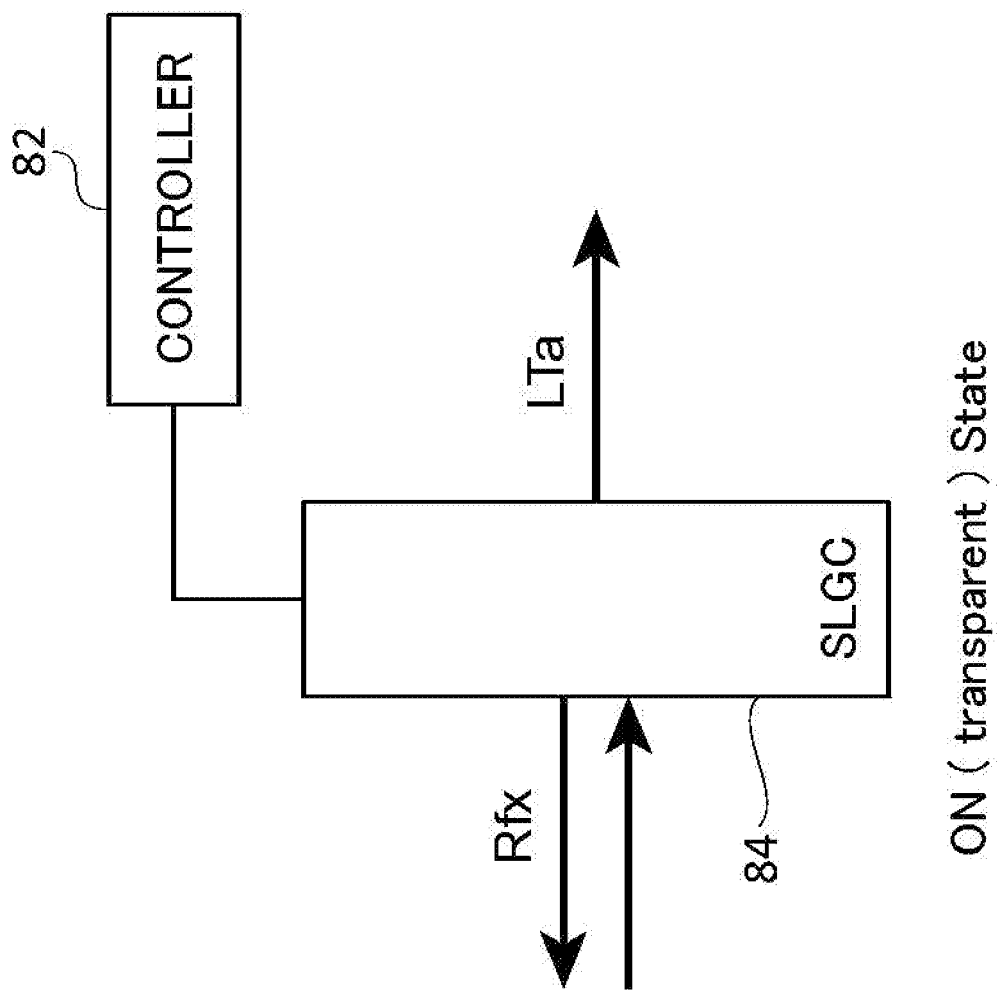
FIG. 5 illustrates a diagram showing the switchable glass construction in an ON state according to the exemplary aspect of the present disclosure.
Figure 6:
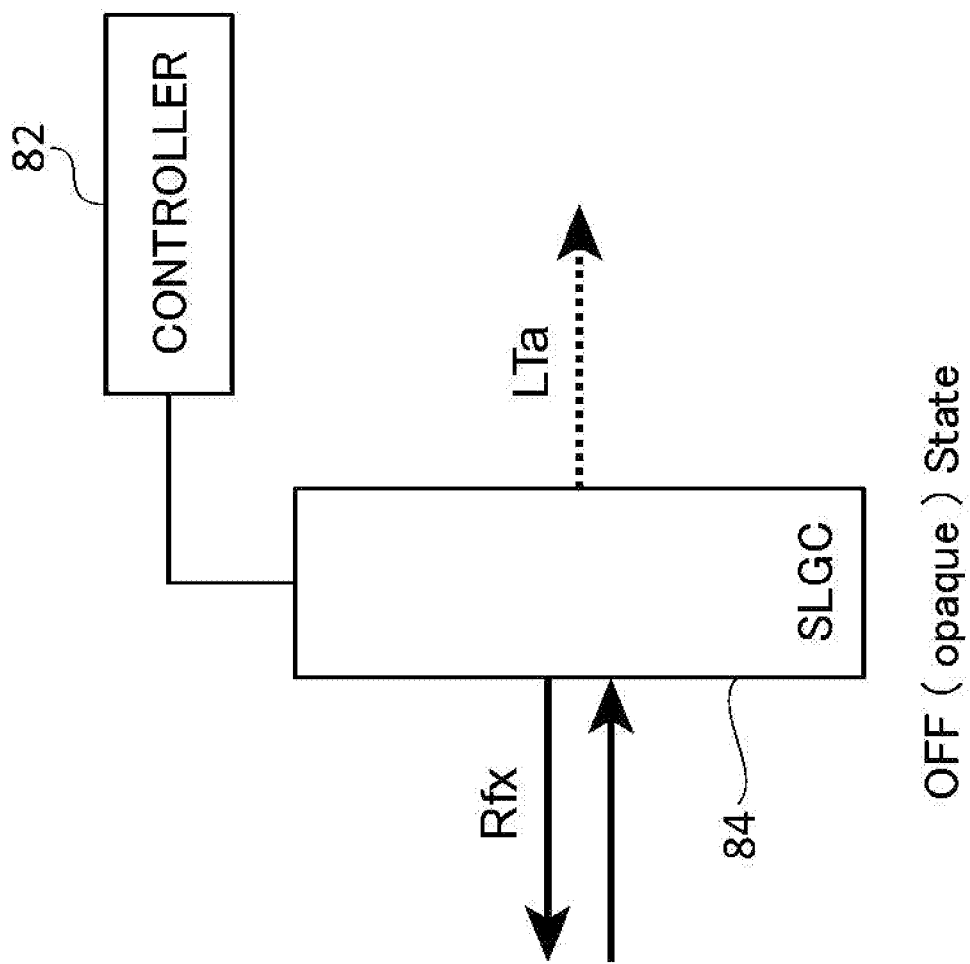
FIG. 6 illustrates a diagram showing the switchable glass construction in an OFF state according to the exemplary aspect of the present disclosure.

FIG. 5 and FIG. 6 show the switchable laminated glass construction in an ON state and in an OFF state. As shown in FIG. 5 and FIG. 6, the switchable laminated glass construction (SLGC) 84 is arranged in a location such as, e.g., a partition arranged between a driver's seat and a passenger's seat. The switchable laminated glass construction 84 is controlled to be the ON (transparent) state and the OFF (opaque) state by a controller 82, which applies a certain voltage between electrodes connected to transparent conductive layers during the ON state upon manipulation of a control not shown.

During the ON state, as shown in FIG. 5, the controller 82 supplies a certain voltage to allow the switchable laminated glass construction 84 to be turned to the ON state, thereby making the glass construction 84 transparent. The total light transmission LTa in the ON state is preferably higher than 50%, more preferably higher than 60%, and more preferably higher than 70%. The total light reflection Rfx of the glass construction 84 in the ON state is less than 13%, more preferably less than 9%, and even more preferably less than 5%. When the driver or the passenger selects to control the switchable laminated glass construction 84 to provide privacy, the controller 82 cuts off the power supplied to the switchable laminated glass construction 84 as entering into the OFF state, thereby making the switchable laminated glass construction 84 opaque. The total light transmission LTa in the OFF state is preferably less than 60%, more preferably less than 55%, and more preferably less than 50%. Visible light transmission, measured by ISO 9050 (2003) using light source A, may be less than 10%, more preferably less than 5%, and more preferably less than 2%. The Rfx of the glass construction 84 in the OFF state is less than 17%, more preferably less than 13%, and even more preferably less than 9%. Switching the switchable laminated glass construction 84 between ON and OFF states may quickly change the transparency of the switchable laminated glass construction 84 or gradually change the transparency of the switchable laminated glass construction 84 such that the switchable laminated glass construction 84 transparency appears to fade in and out between transparent and opaque. In some embodiments, the ON and OFF states may be reversed such that the switchable film is transparent in an OFF state and opaque in an ON state.

Figure 2:
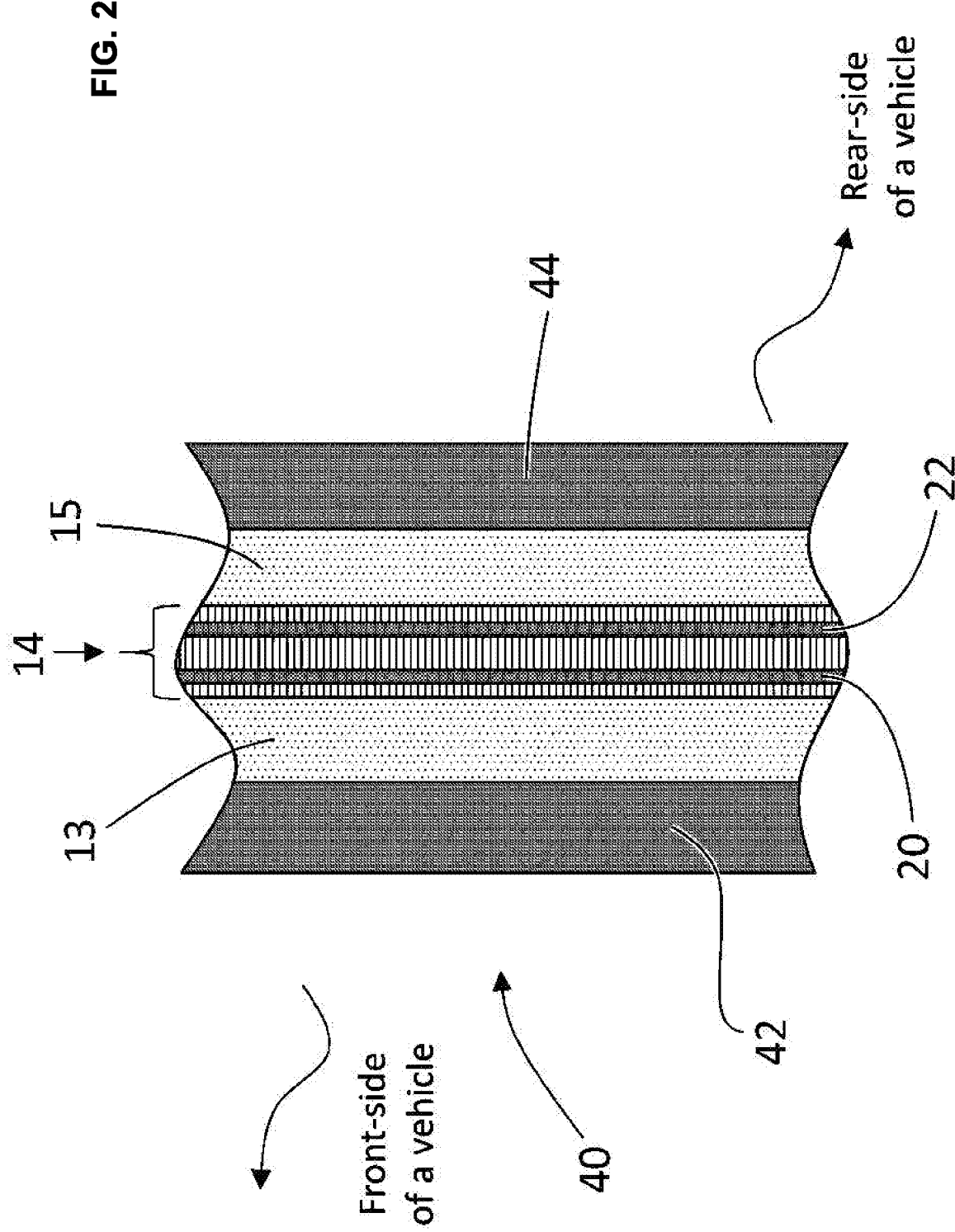
FIG. 2 illustrates another example switchable glass construction, according to an exemplary aspect of the present disclosure.

FIG. 2 shows another exemplary embodiment of a switchable laminated glass construction 40 according to the present disclosure. A first glass substrate 42 and a second glass substrate 44 are darkened glasses such as green, deep green or grey-colored soda-lime silicate glasses which provide a darkened layer to reduce reflection at the transparent conductive oxide layers 20, 22. One or both glass substrates 42, 44 may be a darkened glass substrate according to various embodiments. As with other darkened layers in a lamination, the darkened glass substrates 42, 44 may absorb light, reducing the light which reaches an internal reflective layer and therefore reducing the amount of light reflected off such an internal layer.

Figure 3:
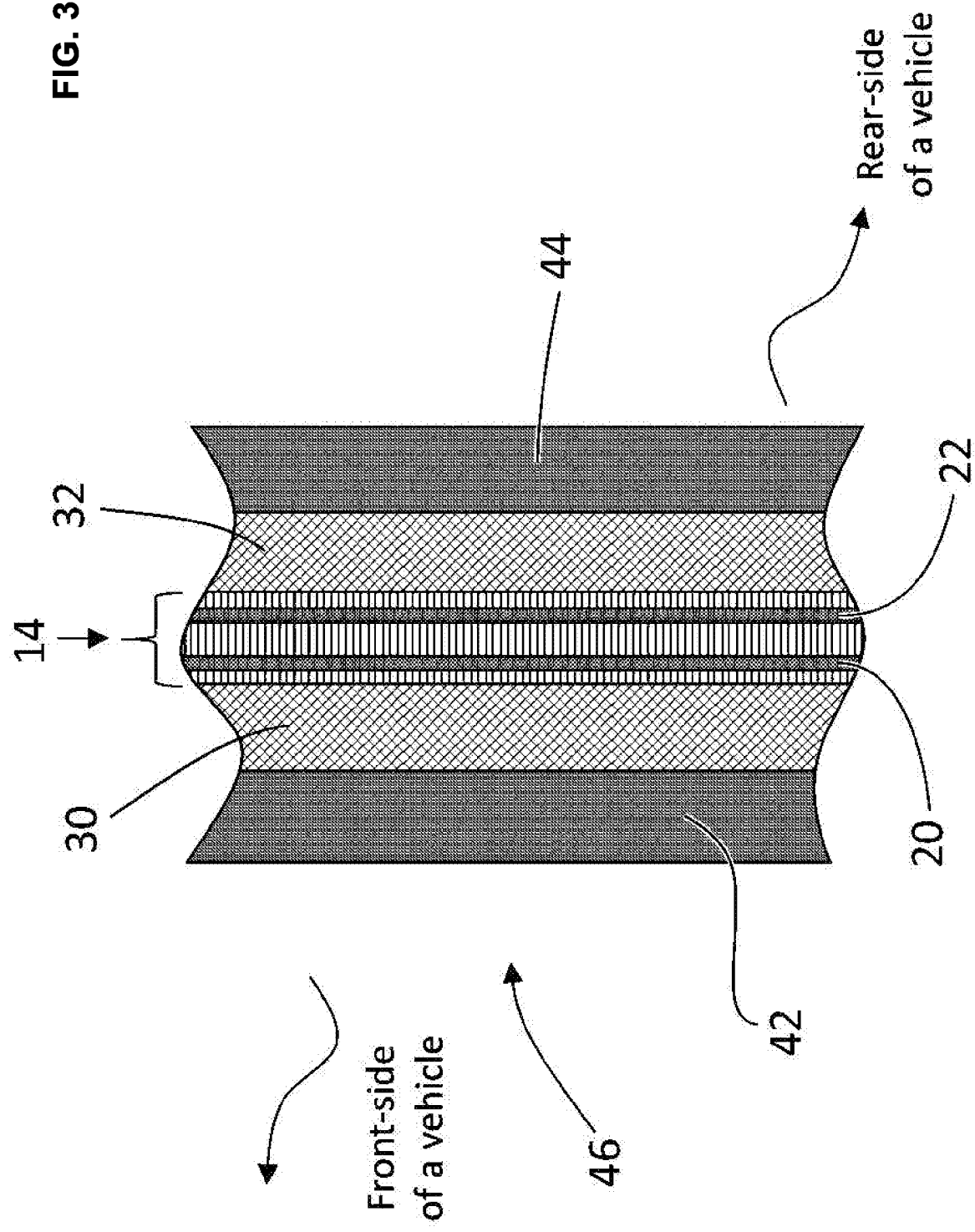
FIG. 3 illustrates yet another example switchable glass construction, according to an exemplary aspect of the present disclosure.

FIG. 3 shows yet another exemplary embodiment of a switchable laminated glass construction 46 according to the present disclosure, in combination with previously described exemplary embodiments in FIG. 1 and FIG. 2. In FIG. 3, at least one of a first glass substrate 42 and a first adhesive polymer interlayer 30 is a darkened layer, and at least one of a second glass substrate 44 and a second adhesive polymer interlayer 32 is a darkened layer. In some embodiments, all of the glass substrates and polymer interlayers may be darkened.

Figure 4:
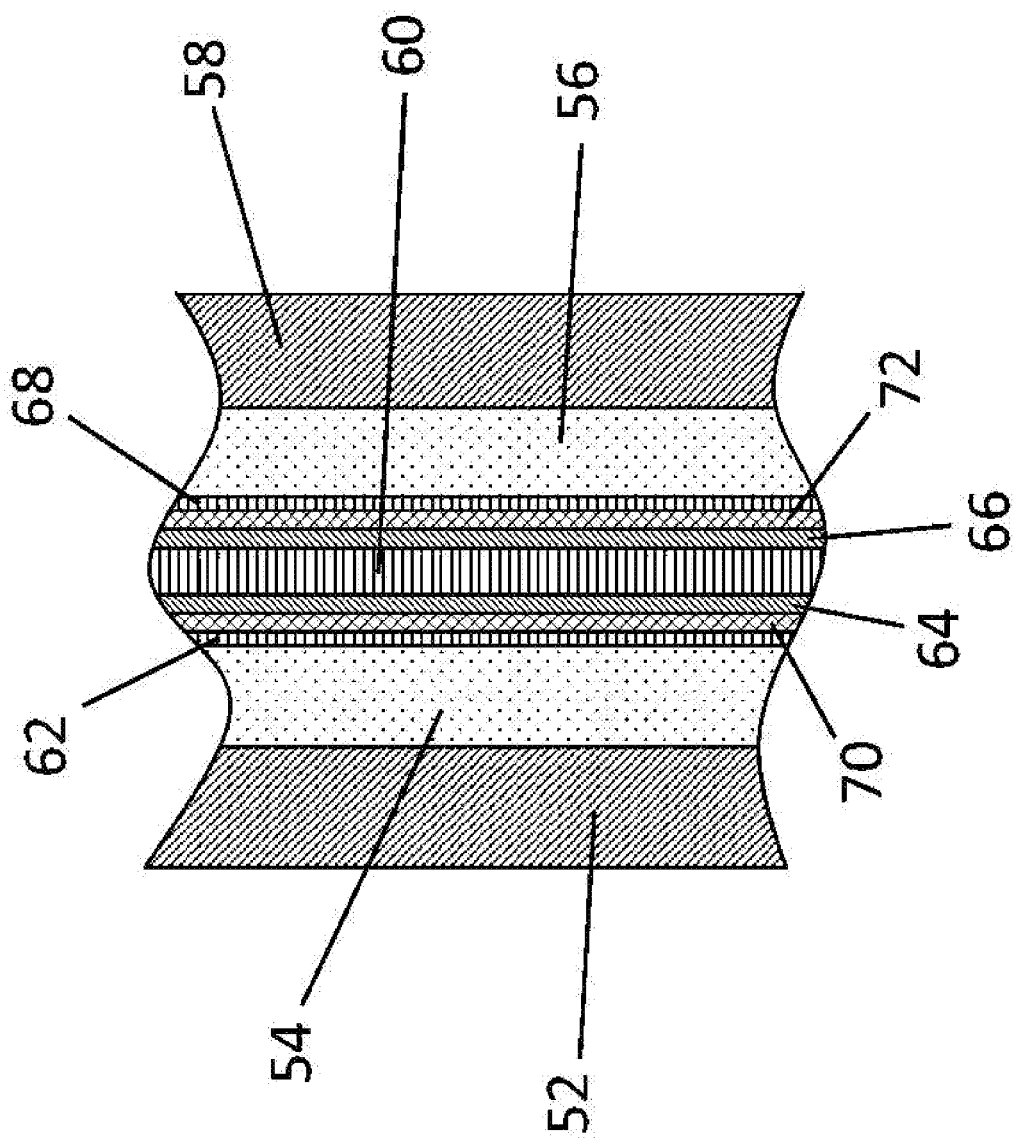
FIG. 4 illustrates an example switchable glass construction, according to an exemplary aspect of the present disclosure.

The reflectivity of a switchable laminated glazing may further be reduced by addressing the change in refractive index through the glazing. As shown in FIG. 4, an embodiment of the present disclosure may include at least one anti-reflective, or refractive index matching, layer within the glazing. As the difference in index of refraction between two adjacent layers in a laminated glazing increases, the reflectivity at the interface of the layers increases, which provides an increased total reflectivity of the laminated glazing. An index matching layer may provide a more gradual change in index of refraction and less reflection at an interface, for example, by providing an index of refraction between those of the adjacent layers. In FIG. 4, a switchable functional film layer 60 is sandwiched by the two adhesive polymer interlayers 54, 56 which are each adhered to the first and second glass substrates 52, 58, respectively, to complete the laminated glass construction. Transparent dielectric layer(s) 70, 72 may be coated between the transparent conductive layers 64, 66 and the polymer films 62, 68. The transparent dielectric layers 70, 72 may be anti-reflective layers. The anti-reflective layer may include an inorganic or organic low reflective index layer, a high reflective index layer, or a combination thereof. Transparent dielectric layers 70, 72 may include, without limitation, any one of an oxide, nitride or oxynitride of Si, Ti, Al or Zr. In some embodiments, anti-reflective and/or index-matching layer(s) may be coated between the transparent conductive layer and switchable material layer. In this case, the anti-reflective or index-matching layers may be electrically conductive or semi-conductive to provide electrical current from the transparent conductive layer to the switchable material layer. In some embodiments, anti-reflective and/or index-matching layers may be coated on both surfaces of the transparent conductive layer (i.e., between the transparent conductive layer and the polymer film and between the transparent conductive layer and the switchable material layer). In some embodiments, an anti-reflective and/or index-matching layer may be provided on a surface of one or both of the polymer films opposite the transparent conductive layers.

In further embodiments, an anti-reflective layer may be provided on a surface of at least one glass substrate 52, 56. Particularly, an exterior glass surface of the laminated glazing may have an anti-reflective layer to decrease the change in index of refraction experienced by light going through the glazing.

The laminated glass constructions disclosed herein may be formed by any suitable lamination process. The lamination process may include aligning the construction layers, including glass substrates, polymer interlayers, and a switchable film, in a glass lamination stack. The glass lamination stack may then be de-aired and autoclaved, which includes treatment at a temperature and pressure (for example, 110 to 160° C. and 10 to 15 bar) to laminate the glass lamination stack.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A switchable laminated glass construction, comprising:
   a first glass substrate;
   a second glass substrate;
   a switchable functional film between the first and second glass substrates, the switchable functional film comprising:
      a switchable material layer,
      a first polymer substrate formed with a first transparent conductive coating, wherein the first polymer substrate is between the first glass substrate and the switchable material layer, and
      a second polymer substrate formed with a second transparent conductive coating, wherein the second polymer substrate is between the second glass substrate and the switchable material layer;
      at least one index-matching layer between the first transparent conductive coating or the second conductive coating and the switchable material layer;
   a first adhesive polymer interlayer between the first glass substrate and the switchable functional film; and
   a second adhesive polymer interlayer between the second glass substrate and the switchable functional film;
   wherein the switchable laminated glass construction has a total light transmittance higher than 50% in a transparent state, as measured from at least one side of the switchable laminated glass construction, wherein the switchable laminated glass construction has a reflectance equal to or less than 13% in a transparent state, as measured from at least one side of the switchable laminated glass construction, and
   wherein at least one of the first adhesive polymer interlayer and the second adhesive polymer interlayer is at least one darkened layer having a darkness for reducing reflectivity from at least one of the first and second transparent conductive coating layers.

2. The switchable laminated glass construction according to claim 1, further comprising an anti-reflective layer.

3. The switchable laminated glass construction according to claim 2, wherein the anti-reflective layer is adjacent to at least one of the first transparent conductive coating and the second transparent conductive coating.

4. The switchable laminated glass construction according to claim 2, wherein the anti-reflective layer is adjacent to at least one of the first glass substrate and the second glass substrate.

5. The switchable laminated glass construction according to claim 2, wherein the anti-reflective layer is adjacent to at least one of the first polymer substrate and the second polymer substrate.

6. The switchable laminated glass construction according to claim 1, wherein the at least one darkened layer comprises at least one of the first glass substrate and the first adhesive polymer interlayer and at least one of the second glass substrate and the second adhesive polymer interlayer.

7. The switchable laminated glass construction according to claim 6, wherein the at least one darkened layer further comprises each of the first and second glass substrates.

8. The switchable laminated glass construction according to claim 6, wherein the at least one darkened layer comprises each of the first glass substrate, the first adhesive polymer interlayer, the second glass substrate, and the second adhesive polymer interlayer.

9. The switchable laminated glass construction according to claim 1, wherein the at least one darkened layer comprises each of the first and second adhesive polymer interlayers.

10. The switchable laminated glass construction according to claim 1, wherein the switchable material layer comprises a polymer dispersed liquid crystal (PDLC) material.

11. The switchable laminated glass construction according to claim 1, wherein the switchable laminated glass construction is an automotive glazing.

12. The switchable laminated glass construction according to claim 11, wherein the automotive glazing is a partition in a vehicle, wherein the automotive glazing comprises at least two surfaces not facing a vehicle exterior.

13. The switchable laminated glass construction according to claim 1, wherein the reflectance of the switchable laminated glass construction is equal or less than 17% in an opaque state, as measured from at least one side of the switchable laminated glass construction.

14. A method of reducing reflectivity in a switchable laminated glass construction, comprising:
   forming a glass lamination stack comprising
      a first glass substrate;
      a second glass substrate;
      a switchable functional film between the first and second glass substrates, wherein the switchable functional film comprises
         a switchable material layer,
         a first polymer substrate formed with a first transparent conductive coating, wherein the first polymer substrate is between the first glass substrate and the switchable material layer,
         a second polymer substrate formed with a second transparent conductive coating, wherein the second polymer substrate is between the second glass substrate and the switchable material layer, and
         at least one index-matching layer between the first transparent conductive coating or the second conductive coating and the switchable material layer;
      a first adhesive polymer interlayer between the first glass substrate and the switchable functional film; and
      a second adhesive polymer interlayer between the second glass substrate and the switchable functional film; and
   de-airing and autoclaving the glass lamination stack to provide the switchable laminated glass construction;
   wherein at least one of the first adhesive polymer interlayer and the second adhesive polymer interlayer is at least one darkened layer-having a darkness for reducing reflectivity from at least one of the first and second transparent conductive coating layers, wherein the switchable laminated glass construction has a reflectance equal to or less than 13% in a transparent state, as measured from at least one side of the switchable laminated glass construction.

15. A method of reducing reflectivity in a switchable laminated glass construction, comprising:

forming a glass lamination stack, comprising
- a first glass substrate;
- a second glass substrate;
- a switchable functional film between the first and second glass substrates, the switchable functional film comprising:
  - a switchable material layer;
  - a first polymer substrate formed with a first transparent conductive coating, wherein the first polymer substrate is between the first glass substrate and the switchable material layer,
  - a second polymer substrate formed with a second transparent conductive coating, wherein the second polymer substrate is between the second glass substrate and the switchable material layer, and
  - at least one index-matching layer between the first transparent conductive coating or the second conductive coating and the switchable material layer;
- a first adhesive polymer interlayer between the first glass substrate layer and the switchable functional film layer;
- a second adhesive polymer interlayer between the second glass substrate layer and the switchable functional film layer; and
- an anti-reflective layer; and de-airing and autoclaving the glass lamination stack to provide the switchable laminated glass construction;

whereby the switchable laminated glass construction has a reflectance equal to or less than 13% in a transparent state, as measured from at least one side of the switchable laminated glass construction, wherein at least one of the first adhesive polymer interlayer and the second adhesive polymer interlayer is at least one darkened layer having a darkness for reducing reflectivity from at least one of the first and second transparent conductive coating layers.

16. The method of reducing reflectivity in the switchable laminated glass construction according to claim 15, wherein the anti-reflective layer is adjacent to at least one of the first transparent conductive coating, and the second transparent conductive coating, the first glass substrate, the second glass substrate, the first polymer substrate, and the second polymer substrate.

* * * * *